US011199857B2

(12) United States Patent
Terahata et al.

(10) Patent No.: US 11,199,857 B2
(45) Date of Patent: Dec. 14, 2021

(54) VEHICLE MANAGEMENT APPARATUS

(71) Applicant: TOYOTA JIDOSHA KABUSHIKI KAISHA, Toyota (JP)

(72) Inventors: Katsuya Terahata, Susono (JP); Yushi Seki, Ashigarakami-gun (JP); Yoshihiro Sakayanagi, Mishima (JP); Koichi Ueda, Susono (JP); Shuntaro Shinohara, Susono (JP); Ryoko Hashimoto, Fuji (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 124 days.

(21) Appl. No.: 16/383,722

(22) Filed: Apr. 15, 2019

(65) Prior Publication Data
US 2019/0377365 A1 Dec. 12, 2019

(30) Foreign Application Priority Data
Jun. 8, 2018 (JP) .............................. JP2018-110408

(51) Int. Cl.
*G05D 1/02* (2020.01)
*B60L 50/61* (2019.01)
*G06Q 20/14* (2012.01)
*G01C 21/34* (2006.01)

(52) U.S. Cl.
CPC ............ *G05D 1/0297* (2013.01); *B60L 50/61* (2019.02); *G01C 21/3407* (2013.01); *G05D 1/0212* (2013.01); *G06Q 20/14* (2013.01); *G05D 2201/0206* (2013.01)

(58) Field of Classification Search
CPC ......... G05D 1/0297; G05D 2201/0206; G05D 1/0212; B60L 50/61; G06Q 20/14; G01C 21/3407
See application file for complete search history.

(56) References Cited

U.S. PATENT DOCUMENTS

| 2006/0278412 | A1* | 12/2006 | Hodges ..................... A62C 3/07 169/60 |
| 2015/0149221 | A1* | 5/2015 | Tremblay ............ B60L 11/1846 705/5 |
| 2016/0201633 | A1* | 7/2016 | Quinteros ............... F16H 63/50 477/111 |
| 2017/0213459 | A1* | 7/2017 | Ogaz ...................... G08G 1/166 |
| 2017/0236415 | A1* | 8/2017 | Okabe .................. G08G 1/0129 701/117 |

(Continued)

FOREIGN PATENT DOCUMENTS

CN      107111936 A    8/2017
DE    102016005937 A1   11/2017
(Continued)

*Primary Examiner* — Tyler J Lee
*Assistant Examiner* — Yufeng Zhang
(74) *Attorney, Agent, or Firm* — Oliff PLC

(57) ABSTRACT

A vehicle management apparatus includes: a communication unit communicating with a vehicle with lodging capability; a vehicle management control unit creating a travel plan based on information transmitted from a user terminal operated by a user, and managing travel of the vehicle; and an emergency vehicle management unit managing so that an emergency vehicle is deployed at a position so as to arrive at a route, on which the vehicle moves according to the travel plan, within a predetermined arrival time.

4 Claims, 10 Drawing Sheets

(56) References Cited

U.S. PATENT DOCUMENTS

| | | | |
|---|---|---|---|
| 2018/0203451 A1* | 7/2018 | Cronin | G05D 1/0088 |
| 2019/0120643 A1* | 4/2019 | Schmell | G01C 21/3438 |
| 2019/0293434 A1* | 9/2019 | Wiz | G01S 17/931 |

FOREIGN PATENT DOCUMENTS

| | | |
|---|---|---|
| JP | H09-152914 A | 6/1997 |
| JP | 2006-338245 A | 12/2006 |
| JP | 2013-061728 A | 4/2013 |

* cited by examiner

FIG.3

CHARGE TABLE

| BOARDING PLACE | BOARDING TIME | GETTING-OFF PLACE | GETTING-OFF TIME | LODGING TIMING | LODGING PLACE | CHARGE LEVEL |
|---|---|---|---|---|---|---|
| SUBURB | 18:00 | CITY CENTER | 9:00 | BEFORE MOVING | SUBURBAN SHOP P | B1 |
| | | | | | SUBURB P | B2 |
| | | | | AFTER MOVING | CITY CENTER SHOP P | S1 |
| | | | | | CITY CENTER P | S2 |
| CITY CENTER | 18:00 | SUBURB | 9:00 | BEFORE MOVING | CITY CENTER SHOP P | S1 |
| | | | | | CITY CENTER P | S2 |
| | | | | AFTER MOVING | SUBURBAN SHOP P | B1 |
| | | | | | SUBURB P | B2 |
| SUBURB | 18:00 | BOARDING PLACE | 9:00 | - | SUBURBAN SHOP P | C1 |
| | | | | | SUBURB P | C2 |
| CITY CENTER | 18:00 | BOARDING PLACE | 9:00 | - | CITY CENTER SHOP P | A1 |
| | | | | | CITY CENTER P | A2 |

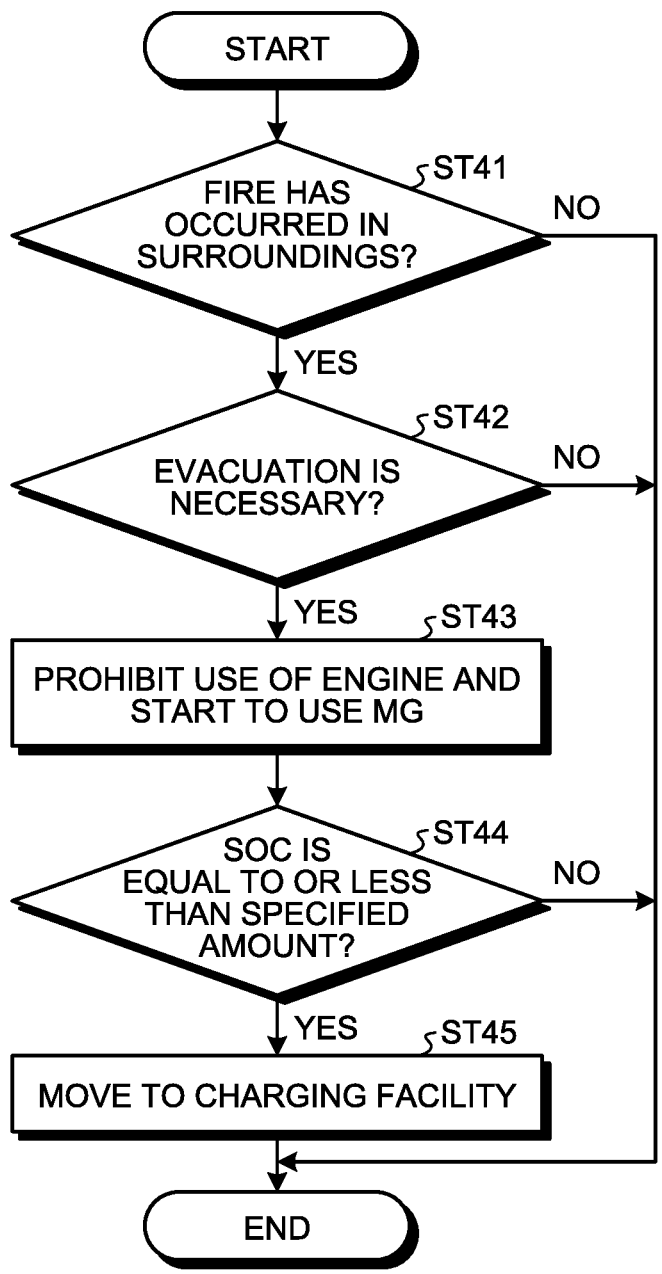

VEHICLE MANAGEMENT APPARATUS

CROSS-REFERENCE TO RELATED APPLICATION(S)

The present application claims priority to and incorporates by reference the entire contents of Japanese Patent Application No. 2018-110408 filed in Japan on Jun. 8, 2018.

BACKGROUND

The present disclosure relates to a vehicle management apparatus.

Japanese Laid-open Patent Publication No. 2013-061728 discloses techniques including a procedure for grasping a traffic schedule route of at least a corresponding emergency vehicle based on information received from an in-vehicle device for an emergency vehicle by a management server; a procedure for grasping a current position of at least a corresponding general vehicle based on information received from an in-vehicle device for a general vehicle by the management server; and a procedure for comparing the traffic schedule route of the emergency vehicle with a current position of a general vehicle by the management server and notifying a general vehicle existing on or near the traffic schedule route of the emergency vehicle of at least emergency information regarding a passage of the emergency vehicle. That is, Japanese Laid-open Patent Publication No. 2013-061728 discloses a technique of grasping the position of a general vehicle and forming a traveling route in order to assist smooth traveling of an emergency vehicle in case of emergency.

SUMMARY

There is a need for providing a vehicle management apparatus capable of improving a possibility that a predetermined response to a user of a target vehicle is promptly provided.

According to an embodiment, a vehicle management apparatus includes: a communication unit communicating with a vehicle with lodging capability; a vehicle management control unit creating a travel plan based on information transmitted from a user terminal operated by a user, and managing travel of the vehicle; and an emergency vehicle management unit managing so that an emergency vehicle is deployed at a position so as to arrive at a route, on which the vehicle moves according to the travel plan, within a predetermined arrival time.

BRIEF DESCRIPTION OF THE DRAWINGS

FIG. 3 is a table illustrating an example of data content of charge information stored in a travel management database of the vehicle management apparatus;

FIG. 12 is a flowchart illustrating an example processing method in a case where fire occurs around a vehicle according to an embodiment of the present disclosure.

DETAILED DESCRIPTION OF THE PREFERRED EMBODIMENTS

Figure 1:
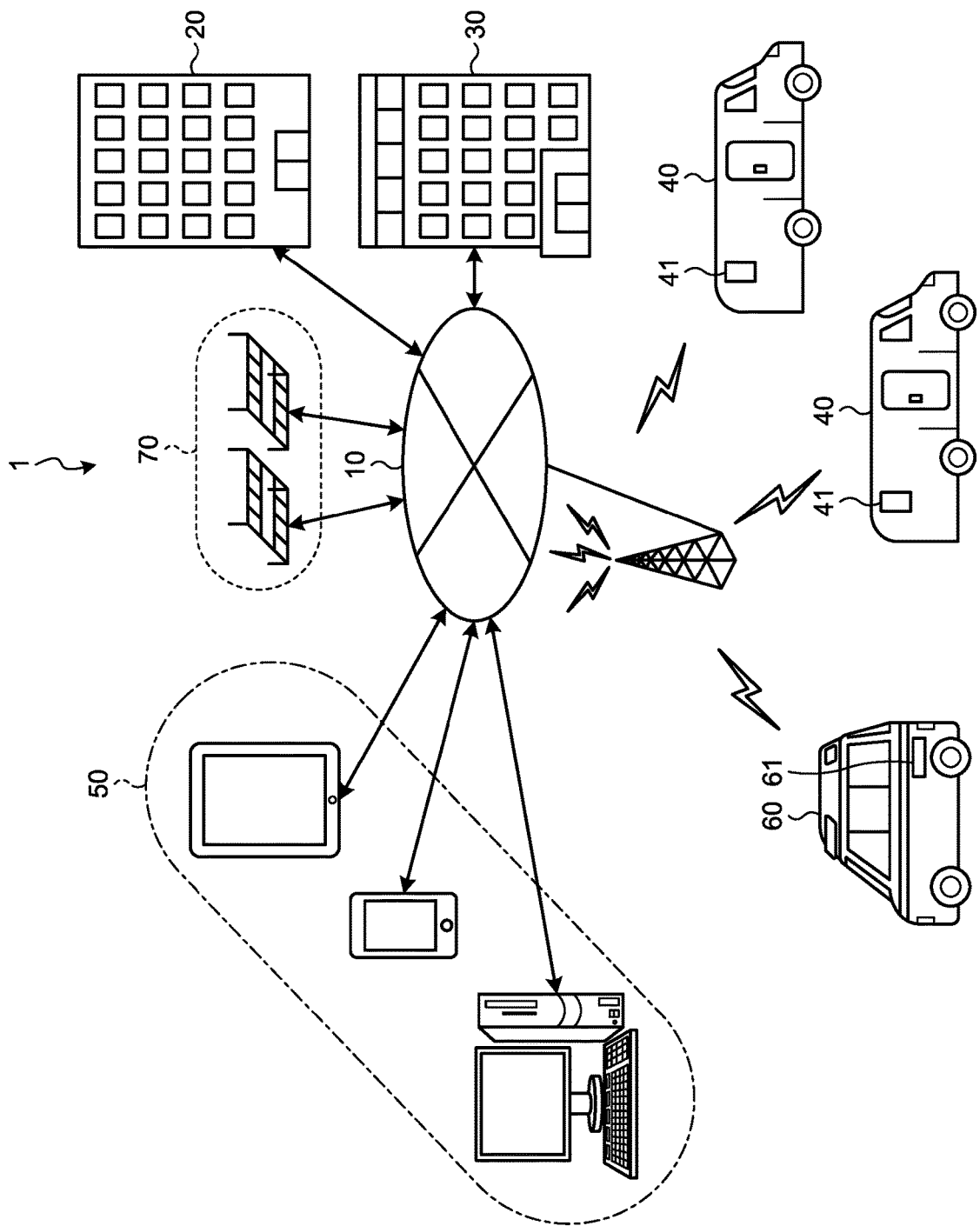
FIG. 1 is a schematic diagram illustrating a vehicle allocation system to which a vehicle management apparatus according to an embodiment of the present disclosure can be applied.

In the technique described in Japanese Laid-open Patent Publication No. 2013-061728, in a case where a distance to a vehicle in which an occupant has caused an abnormality or a place where various accidents have occurred is long, it takes a long time before an emergency vehicle arrives at the destination, and it may be difficult to provide a predetermined response such as rescue rapidly.

Hereinafter, an embodiment of the present disclosure will be described with reference to the drawings. Note that the same reference numerals are used to describe the same or equivalent elements in the drawings. Further, the present disclosure is not limited to the embodiment described below.

First, a vehicle management apparatus according to the embodiment of the present disclosure will be described. FIG. 1 is a schematic diagram illustrating a vehicle allocation system 1 to which the vehicle management apparatus according to the present embodiment can be applied. As illustrated in FIG. 1, the vehicle allocation system 1 according to the present embodiment includes a network 10, a vehicle management apparatus 20, a parking lot management center 30, a vehicle 40 including a vehicle terminal device 41, a user terminal device 50, and an emergency vehicle 60 including an emergency vehicle terminal 61.

The network 10 includes the Internet network, a mobile phone network or the like which provides communication among the vehicle management apparatus 20, the parking lot management center 30, the vehicle 40, the user terminal device 50, and the emergency vehicle 60. That is, in the vehicle allocation system 1 according to the present embodiment, the vehicle management apparatus 20, the parking lot management center 30, the vehicles 40, the user terminal devices 50, and the emergency vehicles 60 are connected to each other so as to be able to communicate with each other via the network 10.

Figure 2:
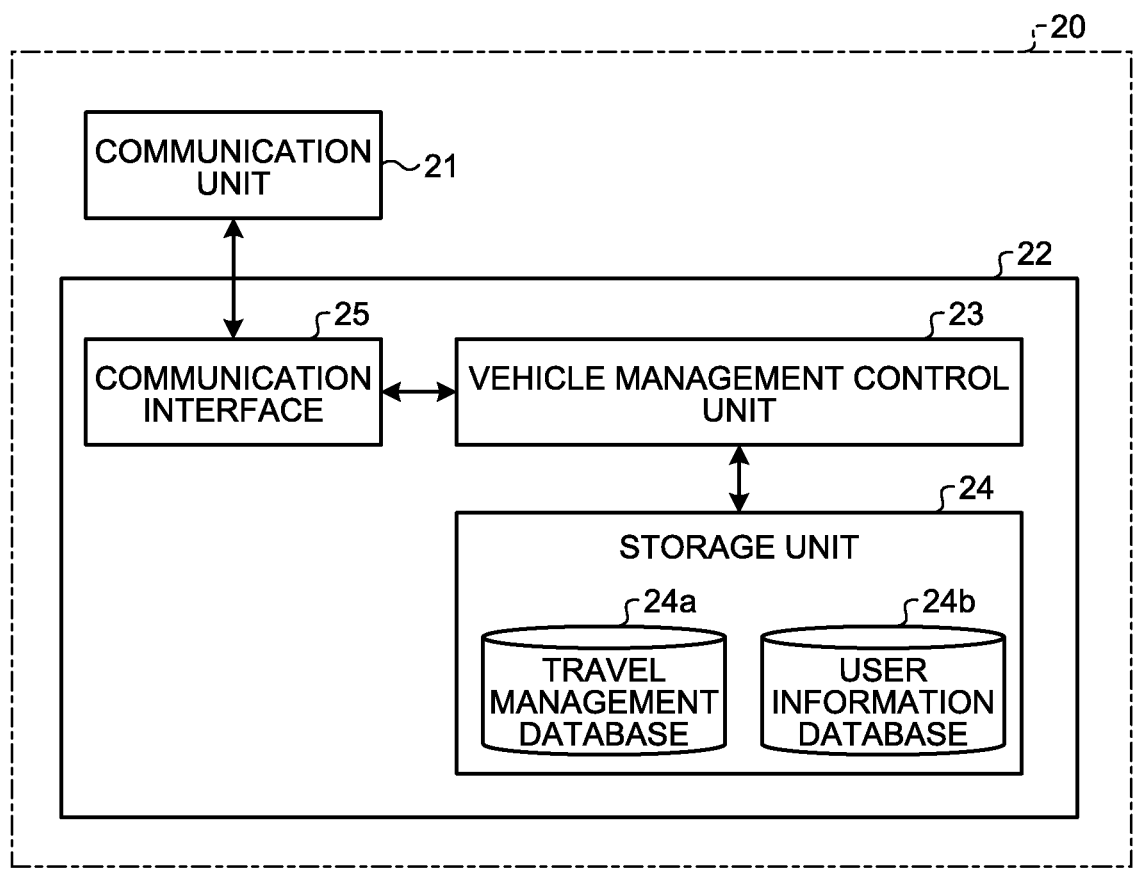
FIG. 2 is a block diagram schematically illustrating an example configuration of the vehicle management apparatus of FIG. 1.

The vehicle management apparatus 20 creates a travel schedule of the vehicle 40 according to user's demand (request), determines a travel plan, and determines whether deployment of the emergency vehicle 60 is necessary and a deployment position thereof when necessary. In addition, the vehicle management apparatus 20 provides travel plan information to the vehicle 40 to manage the travel of the vehicle 40. The vehicle management apparatus 20 provides the travel plan information and also provides various kinds of information regarding the travel of the vehicle 40 to a user. Furthermore, the vehicle management apparatus 20 provides user information and deployment position information described later to the emergency vehicle 60 and receives travel information and position information from the emergency vehicle 60 to manage the emergency vehicle 60. FIG. 2 is a block diagram schematically illustrating an example configuration of the vehicle management apparatus 20.

As illustrated in FIG. 2, the vehicle management apparatus 20 includes a communication unit 21 and a server 22. The communication unit 21 is connected to the server 22 via a communication line built in the vehicle management apparatus 20. The communication unit 21 is connected to the network 10 to communicate with the parking lot management center 30, the vehicle terminal device 41, the user terminal device 50, and the emergency vehicle terminal 61.

The communication unit 21 transmits the travel plan information to the vehicle terminal device 41 and receives the vehicle identification information and travel status information from the vehicle terminal device 41. Note that the vehicle identification information includes information for making each vehicle 40 individually identifiable. The travel status information includes information indicating a travel status, such as position information or speed information regarding the travel of the vehicle 40. The communication unit 21 receives reservation status information from the parking lot management center 30 and transmits parking reservation information to the parking lot management center 30. The reservation status information includes information regarding whether a parking lot 70 can be used. The parking reservation information includes information for reserving a parking date and time and a parking position of the parking lot 70. The communication unit 21 transmits information to the user terminal device 50 owned by a user when the user uses the vehicle 40 and receives user identification information for identifying the user and various kinds of information from the user terminal device 50. The communication unit 21 transmits user information and the deployment position information to the emergency vehicle terminal 61 and receives travel information and the position information from the emergency vehicle terminal 61.

The server 22 includes a vehicle management control unit 23, a storage unit 24, and a communication interface 25. The vehicle management control unit 23 includes a microcomputer, including a Central Processing Unit (CPU), a Read Only Memory (ROM), a Random Access Memory (RAM) and the like, as a main component. The vehicle management control unit 23, serving as an emergency vehicle management unit and a travel management unit, comprehensively controls the management and the deployment of the emergency vehicle 60, the determination of a travel plan, and the operation of the vehicle management apparatus 20 regarding the management of the travel, particularly the operation of the server 22. The communication interface 25 is an interface, built in the vehicle management apparatus 20, for connection to a network line such as a local area network line.

The storage unit 24 includes a storage medium such as a hard disk or a semiconductor memory and a drive device for these storage media, and stores various programs and various kinds of data so as to be written and read. The storage unit 24 includes a travel management database 24a and a user information database 24b, and can store information regarding the travel of the vehicle 40 and the emergency vehicle 60 and the information regarding a user. The travel management database 24a stores, in a searchable manner, various kinds of information necessary for a user to use the vehicle 40 (hereinafter may be referred to as "user selection information") or the like in association with the user identification information. In addition, the travel management database 24a stores, in a searchable manner, the vehicle identification information and the travel status information in association with each other. The vehicle identification information includes information for identifying the vehicle 40 that can be transmitted from the vehicle terminal device 41 mounted on the vehicle 40. Similarly, the travel management database 24a stores, in a searchable manner, emergency vehicle identification information, and the position information, the travel information, and the deployment position information of the emergency vehicle 60 in association with each other. The emergency vehicle identification information includes information for identifying each emergency vehicle 60 that can be transmitted from the emergency vehicle terminal 61 mounted on the emergency vehicle 60. The user information database 24b stores, in a searchable manner, various kinds of information regarding an occupant present on the vehicle 40 (hereinafter, may be referred to as "user information") or the like in association with the user identification information.

When the vehicle identification information and the emergency vehicle identification information are assigned to the vehicle 40 and the emergency vehicle 60, respectively, the vehicle identification information and the emergency vehicle identification information are stored in the travel management database 24a in a searchable state. When the user identification information is assigned to a user, the user identification information is stored in the travel management database 24a and the user information database 24b. The user identification information is registered, for example, in association with a name and an address of a user or the position information such as longitude and latitude representing the position of the user. For example, when a user transmits predetermined information together with the user identification information using the user terminal device 50, the user identification information and the predetermined information are stored in the travel management database 24a or the user information database 24b of the storage unit 24 in a searchable state in association with each other.

In addition, when the vehicle terminal device 41 transmits predetermined information such as the position information or vehicle information together with the vehicle identification information, the vehicle identification information and the predetermined information are stored at a searchable storage position of the travel management database 24a in association with each other. The vehicle information includes information regarding the vehicle 40, such as a battery charge amount (State of Charge (SOC)), an amount of remaining fuel (fuel remaining amount), a current position, or a list of missing items, but is not necessarily limited thereto. In addition, when the emergency vehicle terminal 61 transmits predetermined information such as the deployment position information regarding a position or travel together with emergency vehicle identification information, the emergency vehicle identification information and the predetermined information are stored at a searchable storage position of the travel management database 24a in association with each other.

The travel management database 24a further stores charge information data. FIG. 3 is a table illustrating an example of charge information data used in the present embodiment. As illustrated in FIG. 3, the charge information includes information regarding a boarding place, a boarding time, a getting-off place, a getting-off time, a lodging timing, a lodging place, and a chargevel. Note that the charge information is not limited thereto. For example, the charge information may include information such as a boarding date, a getting-off date, or a main road (highway) used in a travel plan. Details of the contents of the charge information will be described later.

Figure 4:
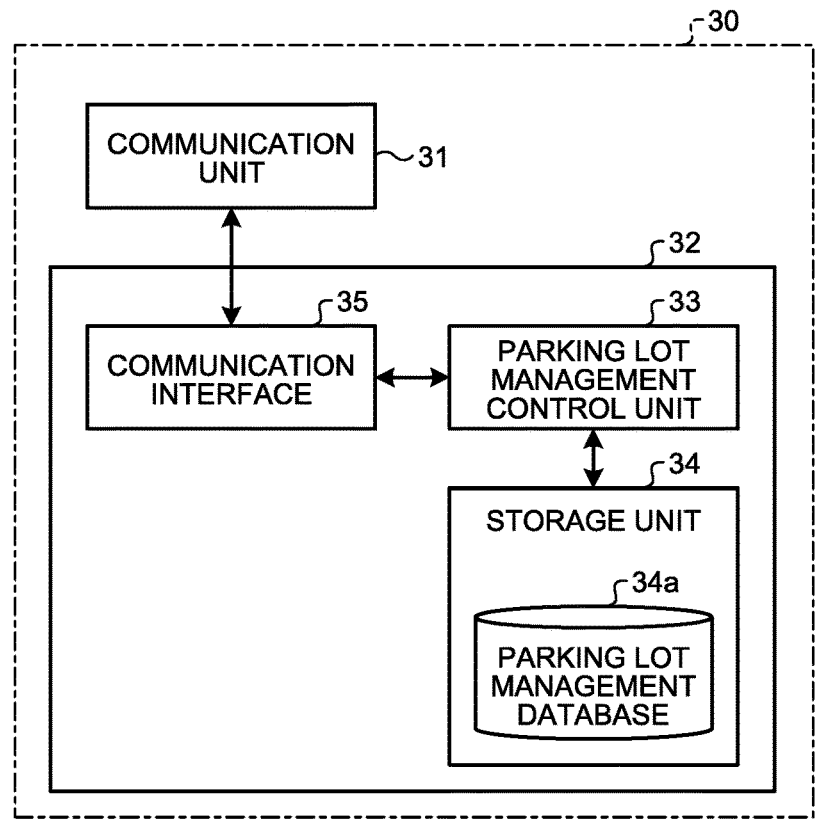
FIG. 4 is a block diagram schematically illustrating an example configuration of a parking lot management center of FIG. 1.

The parking lot management center 30 is configured such that availability of the parking lots 70 at various places is searchable based on a travel plan of the vehicle 40. The parking lot management center 30 reserves parking for each of the parking lots. FIG. 4 is a block diagram schematically illustrating an example configuration of the parking lot management center 30.

As illustrated in FIG. 4, the parking lot management center 30 includes a communication unit 31 and a server 32. The communication unit 31 is connected to the server 32 via a communication line built in the parking lot management center 30. The communication unit 31 is connected to the network 10, and mainly communicates with the vehicle management apparatus 20 and management apparatuses of parking lots 70 at various places. The communication unit 31 receives availability of the parking lot 70 for each date, that is, the reservation status information thereof from the management apparatuses of the parking lots 70, and transmits parking reservation information for reserving a use date, use time, use period of time, and the like of the parking lot 70 to the management apparatus of the parking lot 70.

The server 32 includes a parking lot management control unit 33, a storage unit 34, and a communication interface 35. The parking lot management control unit 33 includes a microcomputer, as a main component, including a CPU, a ROM, a RAM and the like. The parking lot management control unit 33 comprehensively controls an operation of the parking lot management center 30 for performing management of the reservation status information and the parking reservation information of the parking lot 70, particularly operation of the server 32. The storage unit 34 includes a storage medium such as a hard disk or a semiconductor memory, and a drive device for these storage media, and stores various programs and various kinds of data so as to be written and read.

The storage unit 34 includes a parking lot management database 34*a*. The parking lot management database 34*a* stores, in a searchable manner, the reservation status information or the like of the parking lot 70 in association with parking lot identification information. The parking lot identification information includes information for identifying the parking lot 70 transmitted from the management apparatuses of the parking lots 70 (not illustrated) at various places. In addition, the parking lot identification information is registered in association with parking lot information including, for example, the position information of longitude and latitude of the parking lot 70 or a name thereof. When the management apparatus of the parking lot 70 transmits the parking lot information to the parking lot management center 30, the parking lot identification information and the parking information are stored, in a searchable manner, in the parking lot management database 34*a* in association with each other. The communication interface 35 is an interface for connection to a network line built in the parking lot management center 30, such as a Local Area Network (LAN) line.

Parking lot information is transmitted from each of the management apparatuses of the parking lots 70 to the parking lot management center 30 as needed. The parking lot information includes at least the position information, charging equipment information regarding presence or absence of charging equipment, and fueling equipment information regarding presence or absence of fueling equipment capable of fueling at each parking lot 70, and includes the reservation status information regarding parking of the vehicle 40 and other vehicles, parking status information and the like as necessary. The parking lot information may include other information, for example, name information of a parking lot, charge information and the like.

Figure 5:
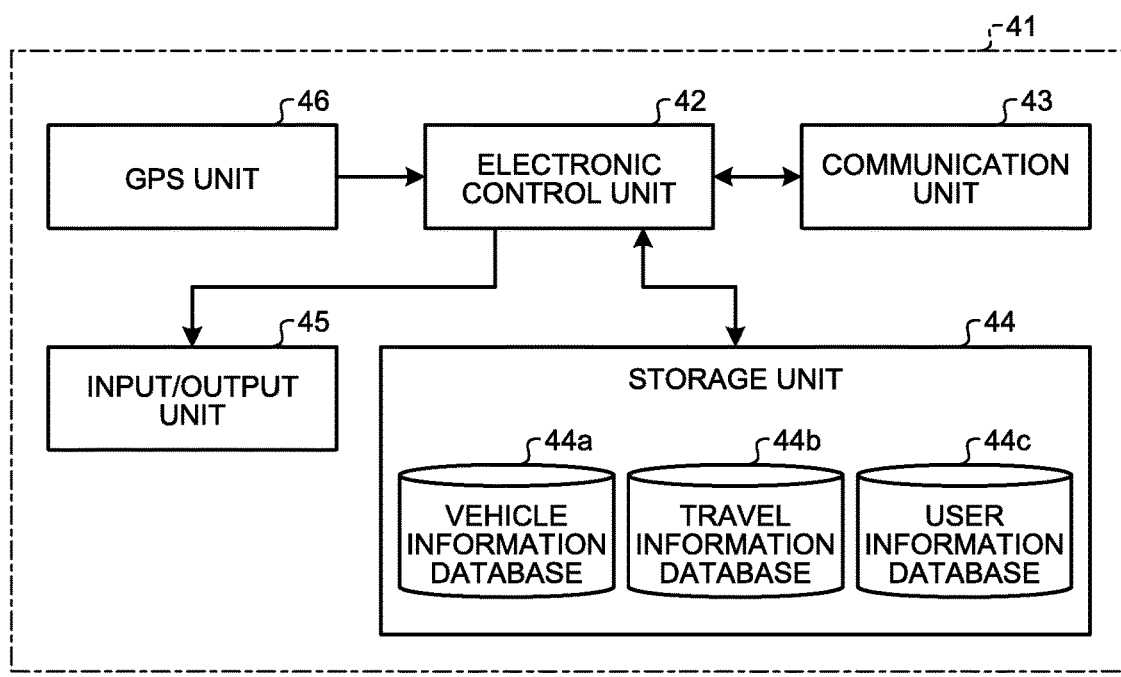
FIG. 5 is a block diagram schematically illustrating an example configuration of the vehicle terminal device mounted on a vehicle of FIG. 1.

The vehicle 40 is a so-called, such as a camping car, including equipment that makes lodging in a vehicle possible. The vehicle 40 includes conventionally known equipment necessary for travel. Specifically, the vehicle 40 includes an engine as a power source. The engine can generate electric power, for example, using a Motor Generator (MG) that is an electric motor driven by fuel combustion. The generated electric power is charged in a rechargeable battery. Furthermore, the vehicle 40 includes a drive transmission mechanism for transmitting a driving force of an engine, drive wheels for traveling and the like. Typically, the vehicle 40 is an accommodation vehicle, which does not have a travel route, travel time and the like (hereinafter referred to as a travel plan) defined in advance, but which travels according to the travel plan appropriately determined according to user's demand or instructions by the vehicle management apparatus 20. However, the vehicle 40 is not necessarily limited to such accommodation vehicle. The vehicle 40 includes the vehicle terminal device 41 capable of transmitting/receiving various kinds of information including the travel plan information by communication with the vehicle management apparatus 20. FIG. 5 is a block diagram schematically illustrating an example configuration of the vehicle terminal device 41 mounted on the vehicle 40.

As illustrated in FIG. 5, the vehicle terminal device 41 includes an electronic control unit 42, a communication unit 43, a storage unit 44, an input/output unit 45, and a Global Positioning System (GPS) unit 46.

The electronic control unit 42 includes a microcomputer, as a main component, including a CPU, a ROM, a RAM and the like. The electronic control unit 42 comprehensively controls an operation of the vehicle terminal device 41 mounted on the vehicle 40. The communication unit 43 communicates with the vehicle management apparatus 20 by wireless communication via the network 10. The storage unit 44 includes a storage medium such as a hard disk or a semiconductor memory, and a drive device for these storage media. The storage unit 44 stores an Operating System (OS) and various application programs necessary for the electronic control unit 42 to comprehensively control an operation of the vehicle terminal device 41.

The storage unit 44 includes a vehicle information database 44*a*, a travel information database 44*b*, and a user information database 44*c*. The vehicle information database 44*a* stores various kinds of information including a battery charge amount, a fuel remaining amount, a current position, a list of missing items and the like in an updatable manner. The travel information database 44*b* stores various kinds of information including the travel plan information provided from the vehicle management apparatus 20 in an updatable manner. The user information database 44*c* stores, in a searchable manner, user information regarding a lodger who lodges in a predetermined vehicle 40 and a user using the vehicle 40 in association with the user identification information and the vehicle identification information. Note that a user includes a lodger in the following description. Here, various kinds of information including user information regarding a user using the predetermined vehicle 40 are appropriately synchronizable with each other according to a predetermined rule in the user information database 44c of the vehicle 40 and the user information database 24b of the vehicle management apparatus 20. For example, regarding the user information of a user using the predetermined vehicle 40, each of the user information databases 24b and 44c updates, with various kinds of information stored in one of the databases including newer user information, various kinds of information in the other of the databases so as to be synchronizable with each other.

The input/output unit 45 includes a touch panel display, a speaker microphone and the like. According to control by the electronic control unit 42, the input/output unit 45, serving as an output unit, displays characters, figures and the like on a screen of a touch panel display or outputs voice from a speaker microphone to be able to notify the outside of predetermined information such as the travel plan information. In addition, the input/output unit 45, serving as an input unit, can input predetermined information to the electronic control unit 42 by operating a touch panel display or by speaking to a speaker microphone by a user or the like. The GPS unit 46 receives a radio wave from a GPS satellite and detects the position of the vehicle 40 on which the vehicle terminal device 41 is mounted. The detected position is stored, in a searchable manner, in the travel information database 44b as the position information in the travel status information.

Figure 6:
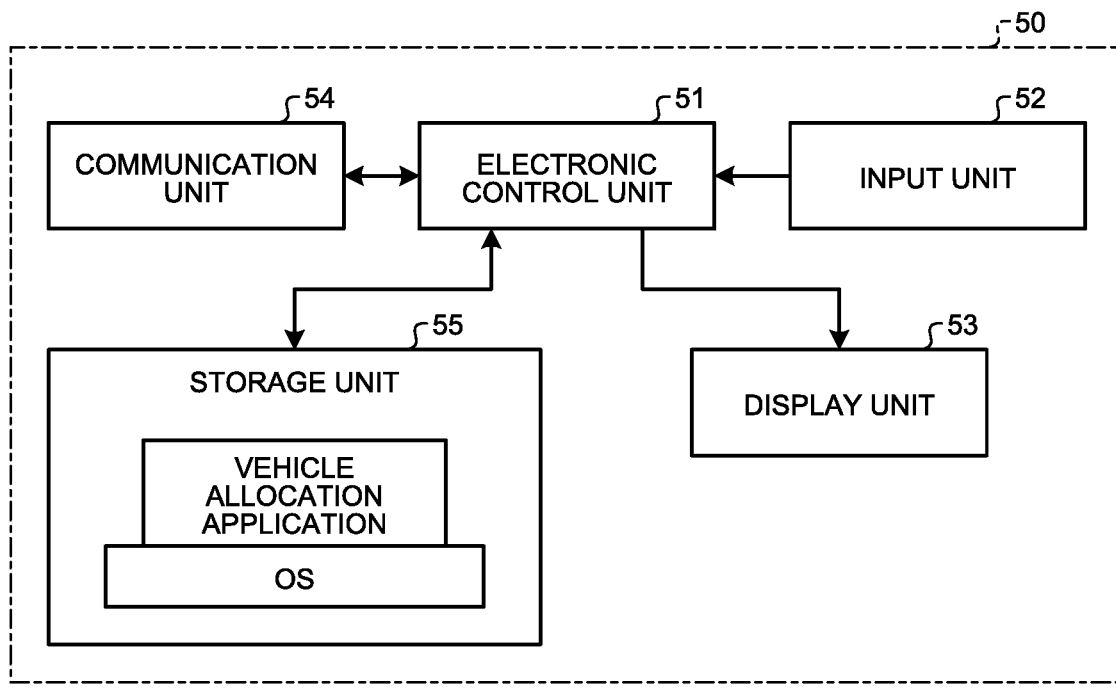
FIG. 6 is a block diagram schematically illustrating an example configuration of a user terminal device of FIG. 1.

The user terminal device 50 as a user terminal is operated by a user. The user terminal device 50 transmits various kinds of information such as user information including the user identification information and the user selection information to the vehicle management apparatus 20, for example, by a call using various kinds of data and voice by a communication application. The user identification information includes information necessary for accessing the vehicle management apparatus 20 at the time of transmitting the user information, such as a user ID or a password. The user terminal device 50 can receive various kinds of information such as the travel plan information, a vehicle allocation approval signal, or electronic key data from the vehicle management apparatus 20. FIG. 6 is a block diagram schematically illustrating an example configuration of the user terminal device 50 of FIG. 1.

As illustrated in FIG. 6, the user terminal device 50 includes an electronic control unit 51, an input unit 52, a display unit 53, a communication unit 54, and a storage unit 55 connected so as to be able to communicate with each other. The electronic control unit 51 includes a microcomputer, as a main component, including a CPU, a ROM, a RAM and the like. The electronic control unit 51 comprehensively controls the operations of the input unit 52, the display unit 53, the communication unit 54, and the storage unit 55 by executing various application programs.

The input unit 52 includes, for example, a touch panel display, incorporating a keyboard or the display unit 53, detecting a touch operation to the display panel thereof, and a voice input device, such as a speaker microphone, that makes it possible to a call outside. Here, specific examples of the call with the outside include a call with an operator or an artificial intelligence system permanently staying in the vehicle management apparatus 20. The display unit 53 includes, for example, an organic EL panel and a liquid crystal display panel, and notifies the outside of information by displaying characters, figures, and the like on a display panel.

The communication unit 54 is connected to the network 10 and implements a function of transmitting/receiving various kinds of information such as the user identification information, the user selection information, the travel plan information, and voice data to/from the vehicle management apparatus 20. The storage unit 55 stores an OS for the electronic control unit 51 to comprehensively control the operation of the user terminal device 50, various application programs including a vehicle allocation application (hereinafter referred to as a vehicle allocation application), and various kinds of information. The storage unit 55 can store the user identification information.

As the above-described user terminal device 50, specifically, a mobile phone such as a smartphone, an information terminal such as a tablet type, a personal computer or the like can be used. Note that a desktop type personal computer or a fixed telephone installed at home or the like may also be used.

Figure 7:
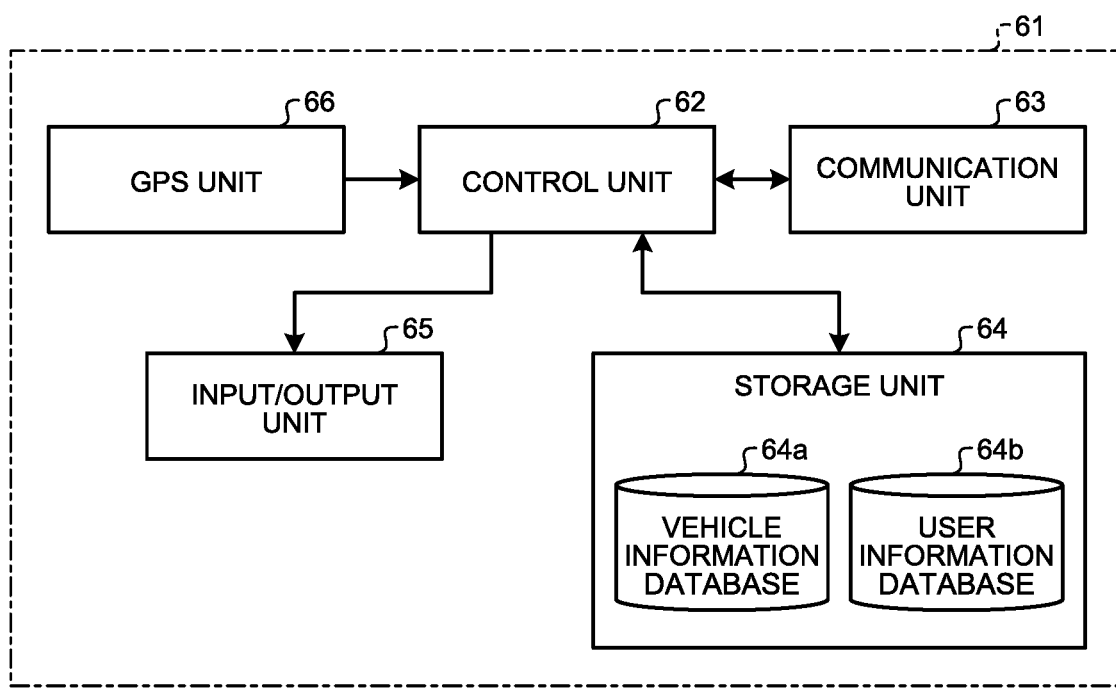
FIG. 7 is a block diagram schematically illustrating an example configuration of an emergency vehicle terminal mounted on an emergency vehicle of FIG. 1.

The emergency vehicle 60 is, for example, a patrol car, a vehicle for emergency (ambulance), or a doctor car, and is defined as an emergency vehicle defined by the Enforcement Order of the Road Traffic Act. The emergency vehicle 60 includes conventionally known equipment necessary for travel and emergency services. Specifically, the emergency vehicle 60 includes an engine or an MG as a drive source, a battery capable of performing charge with generated electric power and the like. The emergency vehicle 60 further includes a drive transmission mechanism for transmitting a driving force of an engine, drive wheels for traveling and the like. The emergency vehicle 60 includes various facilities which can respond to emergency services, such as bedding, in a vehicle compartment thereof and includes the emergency vehicle terminal 61 capable of transmitting/receiving various kinds of information including the deployment position information by communication with the vehicle management apparatus 20. FIG. 7 is a block diagram schematically illustrating an example configuration of the emergency vehicle terminal 61 mounted on the emergency vehicle 60.

As illustrated in FIG. 7, the emergency vehicle terminal 61 includes a control unit 62, a communication unit 63, a storage unit 64, an input/output unit 65, and a GPS unit 66. The control unit 62 includes a microcomputer, as a main component, including a CPU, a ROM, a RAM and the like. The control unit 62 comprehensively controls the operations of the emergency vehicle terminal 61 mounted on the emergency vehicle 60. The communication unit 63 mainly communicates with the vehicle management apparatus 20 and the vehicle 40 by wireless communication via the network 10. The storage unit 64 includes a storage medium such as a hard disk or a semiconductor memory, and a drive device for these storage media. The storage unit 64 stores an OS and various application programs necessary for the control unit 62 to comprehensively control operation of the emergency vehicle terminal 61.

The storage unit 64 includes a vehicle information database 64a and a user information database 64b. The vehicle information database 64a stores various kinds of information regarding the emergency vehicle 60 including a fuel remaining amount, a current position, a deployment position, a list of items, and the like so as to be updatable. The user information database 64b stores, in a searchable manner, the user information regarding a user requiring deployment of the emergency vehicle 60 in association with the user identification information and the vehicle identification information. Here, various kinds of information including the user information regarding a user using a predetermined emergency vehicle 60 are appropriately synchronizable with each other according to a predetermined rule in the user information database 64b of the emergency vehicle 60 and the user information database 24b of the vehicle management apparatus 20. For example, regarding the user information of a user desiring deployment of a predetermined emergency vehicle 60, each of the user information databases 24b and 64b updates, with various kinds of information stored in one of the databases including newer user information, various kinds of information in the other of the databases so as to be synchronizable with each other.

The input/output unit 65 includes a touch panel display, a speaker microphone and the like. According to control by the control unit 62, the input/output unit 65 as an output unit displays characters, figures and the like on a screen of a touch panel display or outputs voice from a speaker microphone to be able to notify the outside of predetermined information. The input/output unit 65 as an input unit can input predetermined information to the control unit 62 by operating a touch panel display or by inputting voice from a speaker microphone by a user or the like. The GPS unit 66 receives a radio wave from a GPS satellite and detects the position of the emergency vehicle 60 on which the emergency vehicle terminal 61 is mounted. The detected position is stored, in a searchable manner, in the vehicle information database 64a as position information in the emergency vehicle 60.

Method for Processing Vehicle Allocation

Figure 8:
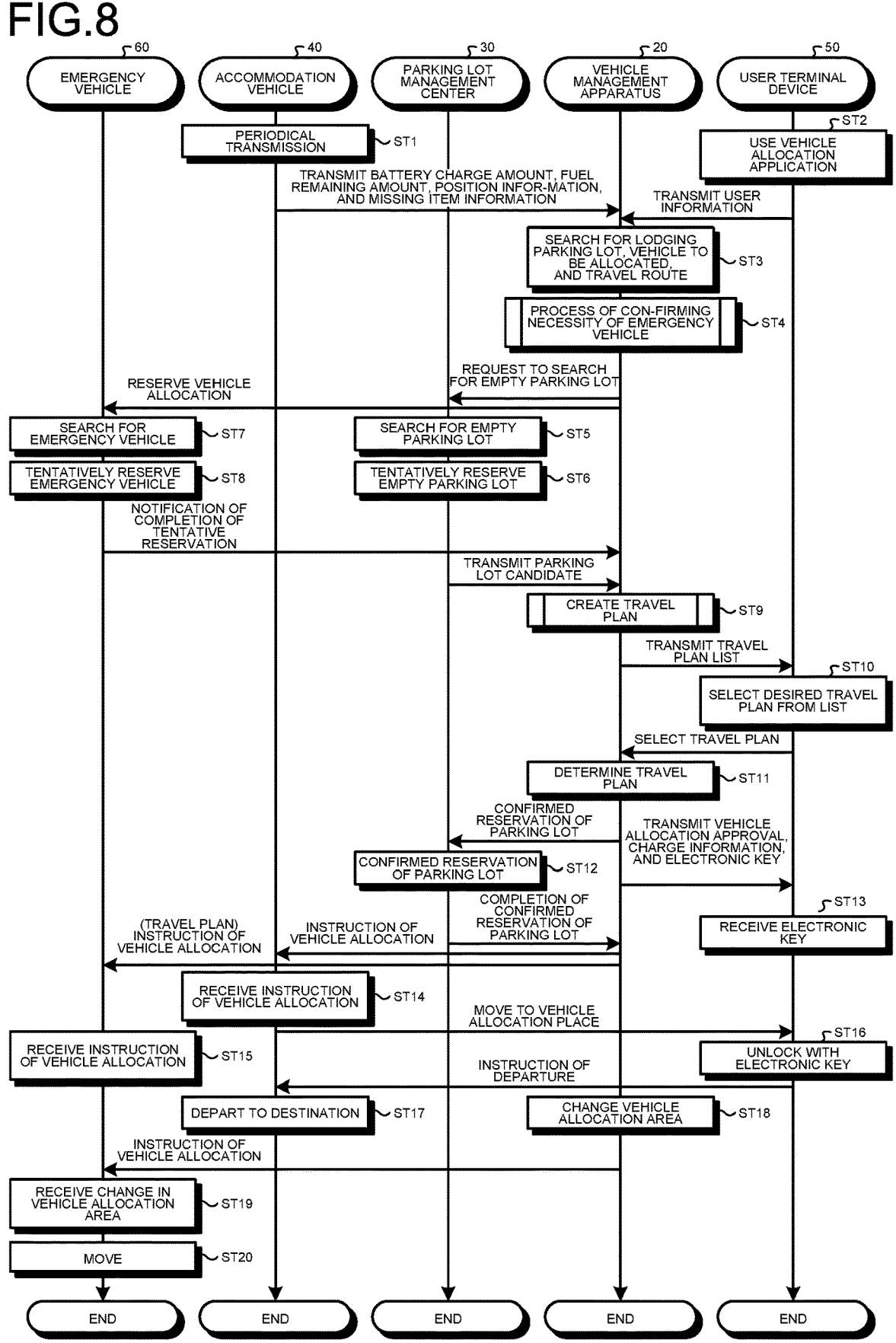
FIG. 8 is a flowchart illustrating a processing method performed in the vehicle allocation system.

Next, described is a method for processing a vehicle allocation according to the embodiment of the present disclosure by the vehicle allocation system 1 configured as described above. FIG. 8 is a flowchart illustrating a processing method used in the vehicle allocation system 1.

As illustrated in FIG. 8, first, in step ST1, from each of a plurality of the vehicles 40, various pieces of information regarding the vehicles 40 are periodically transmitted to the vehicle management apparatus 20. Here, the term "periodically" means every predetermined time such as every hour or every three hours. Note that the transmission/reception of information is performed via the network 10, but description thereof will be omitted in the following description. The vehicle management control unit 23 of the vehicle management apparatus 20 stores the vehicle information received via the communication unit 21 and the communication interface 25 in the storage unit 24 in association with the vehicle identification information of each of the vehicles 40.

Meanwhile, in step ST2, by the user's operation of the user terminal device 50, a vehicle allocation application is activated in the user terminal device 50. The vehicle allocation application is activated and executed based on an operation program stored in the user terminal device 50, such as an Operating System (OS). Note that step ST2 is executed independently of step ST1. The user terminal device 50 that has executed the vehicle allocation application transmits the user identification information input by a user or stored in the user terminal device 50 to the vehicle management apparatus 20. Hereinafter, in the user terminal device 50, the transmission/reception of various kinds of information and storage of information in the storage unit 55 or the like at the time of using the vehicle allocation system 1 are appropriately executed by the vehicle allocation application.

The user terminal device 50 transmits the user selection information and the user information input by a user using the user terminal device 50 to the vehicle management apparatus 20 as the user information together with the user identification information.

The user selection information herein refers to necessary information selected from boarding position information including a boarding place, getting-off position information including a getting-off place, boarding position and getting-off position information including boarding position information and getting-off position information, boarding time information including boarding time, getting-off time information including getting-off time, and lodging timing information including a lodging timing. Here, the lodging timing refers to a timing at which lodging is performed in the parking lot 70 close to either a boarding place or a getting-off place when a user moves from a boarding place desired by the user to a getting-off place. It is assumed that the case where lodging is performed in the parking lot 70 close to a boarding place is a case where the lodging timing is before moving to a getting-off position, and the case where lodging is performed in the parking lot 70 close to a getting-off place is a case where the lodging timing is after moving to a getting-off position. The lodging timing information includes information before or after moving to a getting-off position selected by a user. The vehicle management control unit 23 of the vehicle management apparatus 20 stores, in a searchable manner, the user selection information received via the communication unit 21 and the communication interface 25 in the storage unit 24 in association with each piece of the user identification information.

The user information refers to information regarding an individual user who boards the vehicle 40 for use. The user information can be input from a vehicle allocation application or the like in the user terminal device 50. The user information that has been input is stored in the user information database 24b of the storage unit 24, serving as a user information storage unit. The user information includes at least the nationality, age, gender and the like of a user. The user information further includes necessary information selected from presence or absence of a chronic disease, a disease, an injury, and a disorder of a user, and these kinds of information. Incidentally, information regarding an age is not limited to a specific age, but may be information indicating whether a user is older than a predetermined age such as the age of 60 or information regarding an age range such as 50's or 60's. In addition, concerning a chronic disease, a disease, an injury, and a disorder of a user, information regarding the degree thereof may be included. As described later, the emergency vehicle 60 is deployed such that time to arrive at the vehicle 40 is within a predetermined arrival time. The vehicle management control unit 23 sets a predetermined arrival time for each vehicle 40 based on various kinds of information included in the user information.

The user information further includes billing information indicating whether a charge so as to receive a rescue has been paid, the amount paid as the charge and the like when, for example, the condition of a user suddenly changes. The billing information includes information regarding a charge so as to deploy the emergency vehicle 60. Based on the billing information included in the user information, the vehicle management control unit 23 determines the above-described predetermined arrival time which is an upper limit of time before arriving at the vehicle 40. Specifically, for example, the vehicle management control unit 23 increases or decreases the predetermined arrival time according to the amount of the charge paid by a user included in the billing information and set the predetermined arrival time.

Thereafter, in step ST3, the vehicle management apparatus 20 searches for a vehicle 40 to be allocated to the user, a parking lot 70 for lodging (also referred to as a lodging parking lot 70), and a travel route based on the received vehicle information and the user information. Here, the lodging parking lot 70 refers to a parking lot 70 in which the vehicle 40 that has been searched for is parked for the user or the like to lodge in the vehicle. The vehicle 40 to be allocated is a vehicle 40 to be moved such that a user can board the vehicle among various vehicles 40. The travel route refers to a traveling route on a road on which a vehicle can travel, selected according to a purpose-specific traveling pattern in traveling of the vehicle 40 based on the user selection information transmitted from the user terminal device 50. Based on a travel route that has been searched for, the vehicle management control unit 23 searches for a time zone during which the vehicle 40 is parked in the lodging parking lot 70. The vehicle management apparatus 20 transmits a signal of a request for searching for a lodging parking lot in which a vehicle can be parked during the time zone, present along the travel route that has been searched for (hereinafter referred to as an "empty parking lot"), to the parking lot management center 30

Process of Confirming Necessity of Emergency Vehicle

Figure 9:
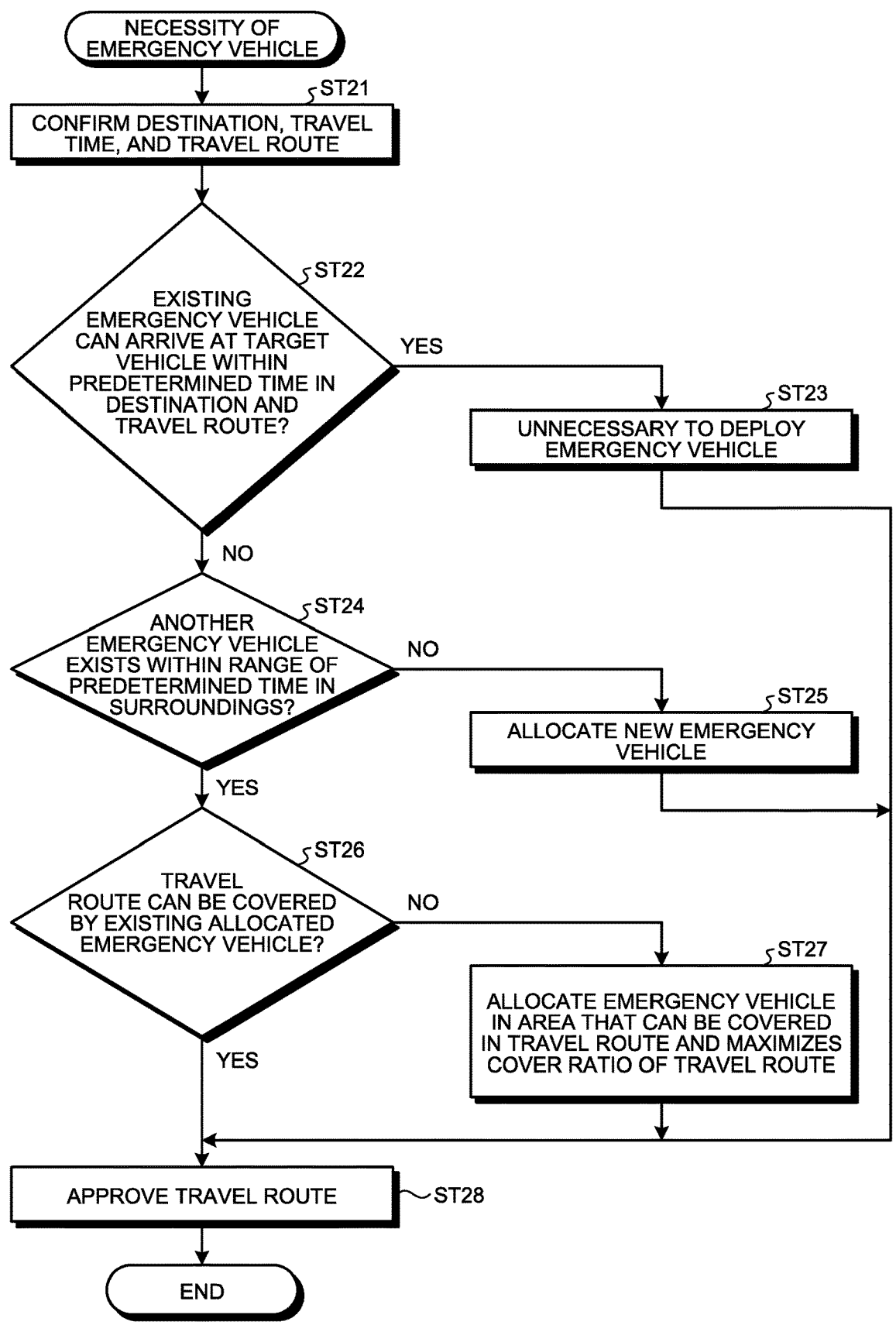
FIG. 9 is a flowchart illustrating a method of confirming whether a support by an emergency vehicle of FIG. 8 is necessary.

Thereafter, in step ST4, the vehicle management apparatus 20 performs a process of confirming necessity of the emergency vehicle 60. Here, a specific example of a method for confirming necessity of the emergency vehicle 60 will be described below. FIG. 9 is a flowchart illustrating the method for confirming the necessity of the emergency vehicle 60 and the allocating method of FIG. 8.

As illustrated in FIG. 9, in the method for confirming necessity of the emergency vehicle 60 according to the present embodiment, first, in step ST21, the vehicle management control unit 23 acquires the information regarding a destination and a travel time received in step ST3, and extracts the information regarding a travel route that has been searched for. As a result, the vehicle management control unit 23 confirms the information regarding at least one travel route.

Next, the process proceeds to step ST22, and the vehicle management control unit 23 judges whether an existing emergency vehicle 60 can arrive at a target vehicle 40 within a predetermined arrival time while the target vehicle 40 is traveling based on the confirmed destination and travel route. Incidentally, the "existing emergency vehicle 60" refers to a public emergency vehicle 60 deployed in a public fire station or the like. If the vehicle management control unit 23 judges that the existing emergency vehicle 60 can arrive at the target vehicle 40 within the predetermined arrival time (YES in step ST22), the process proceeds to step ST23. In step ST23, the vehicle management control unit 23 judges that there is no need to newly deploy an emergency vehicle 60, and the process proceeds to step ST28.

Meanwhile, in step ST22, if the vehicle management control unit 23 judges that the existing emergency vehicle 60 cannot arrive at the target vehicle 40 within the predetermined arrival time (NO in step ST22), the process proceeds to step ST24. In step ST24, the vehicle management control unit 23 judges whether an emergency vehicle 60, which is already deployed for another vehicle 40, (i.e., an existing allocated emergency vehicle 60) can arrive at the target vehicle 40 within the predetermined arrival time. In other words, the vehicle management control unit 23 performs searching to judge whether there is any allocated emergency vehicle 60 existing within a range in which the allocated emergency vehicle 60 can arrive within the predetermined arrival time around the travel route of the target vehicle 40. Here, the "existing allocated emergency vehicle 60" typically refers to a private emergency vehicle already allocated by the vehicle management control unit 23 or the like, but may be a public emergency vehicle as long as possible. If the vehicle management control unit 23 judges that there is no existing allocated emergency vehicle 60 (NO in step ST24), the process proceeds to step ST25.

In step ST25, the vehicle management control unit 23 allocates a new emergency vehicle 60 in order to newly deploy the emergency vehicle 60. Incidentally, when the newly allocated emergency vehicle 60 is deployed, the vehicle management apparatus 20 transmits a vehicle allocation instruction signal to the emergency vehicle 60. The deployment position of the emergency vehicle 60 is selected from positions from which the emergency vehicle 60 can arrive at the target vehicle 40 within the predetermined arrival time based on a travel route and travel time of the target vehicle 40. Thereafter, the process proceeds to step ST28.

In step ST24, if the vehicle management control unit 23 judges that the existing allocated emergency vehicle 60 exists (YES in step ST24), the process proceeds to step ST26. In step ST26, the vehicle management control unit 23 judges whether the travel route of the target vehicle 40 can be covered by the existing allocated emergency vehicle 60. Here, the phrase that "can be covered" means that the state in which the emergency vehicle 60 can arrive at the target vehicle 40 within a predetermined arrival time can be maintained. At this time, a case where the state in which the emergency vehicle 60 can arrive at the target vehicle 40 within a predetermined arrival time can be maintained by appropriately moving the emergency vehicle 60 is also included. If the vehicle management control unit 23 judges that the travel route of the target vehicle 40 cannot be covered by the existing allocated emergency vehicle 60 (NO in step ST26), the process proceeds to step ST27.

In step ST27, the vehicle management control unit 23 newly allocates an emergency vehicle 60 such that the travel route of the target vehicle 40 can be covered. Furthermore, the vehicle management control unit 23 deploys an emergency vehicle 60 in an area that can be covered as much as possible also in a travel route of another vehicle 40, and maximizes a probability that covering is possible, and allocates the emergency vehicle 60. Thereafter, the process proceeds to step ST28. Meanwhile, in step ST26, if the vehicle management control unit 23 judges that the travel route of the target vehicle 40 can be covered by the existing allocated emergency vehicle 60 (YES in step ST26), the process proceeds to step ST28.

In step ST28, the vehicle management control unit 23 approves the travel route of the target vehicle 40. In the approved travel route, the emergency vehicle 60 can arrive at the target vehicle 40 within a predetermined arrival time. As described above, the process of confirming the necessity of the emergency vehicle 60 by the vehicle management control unit 23 is terminated.

Figure 10:
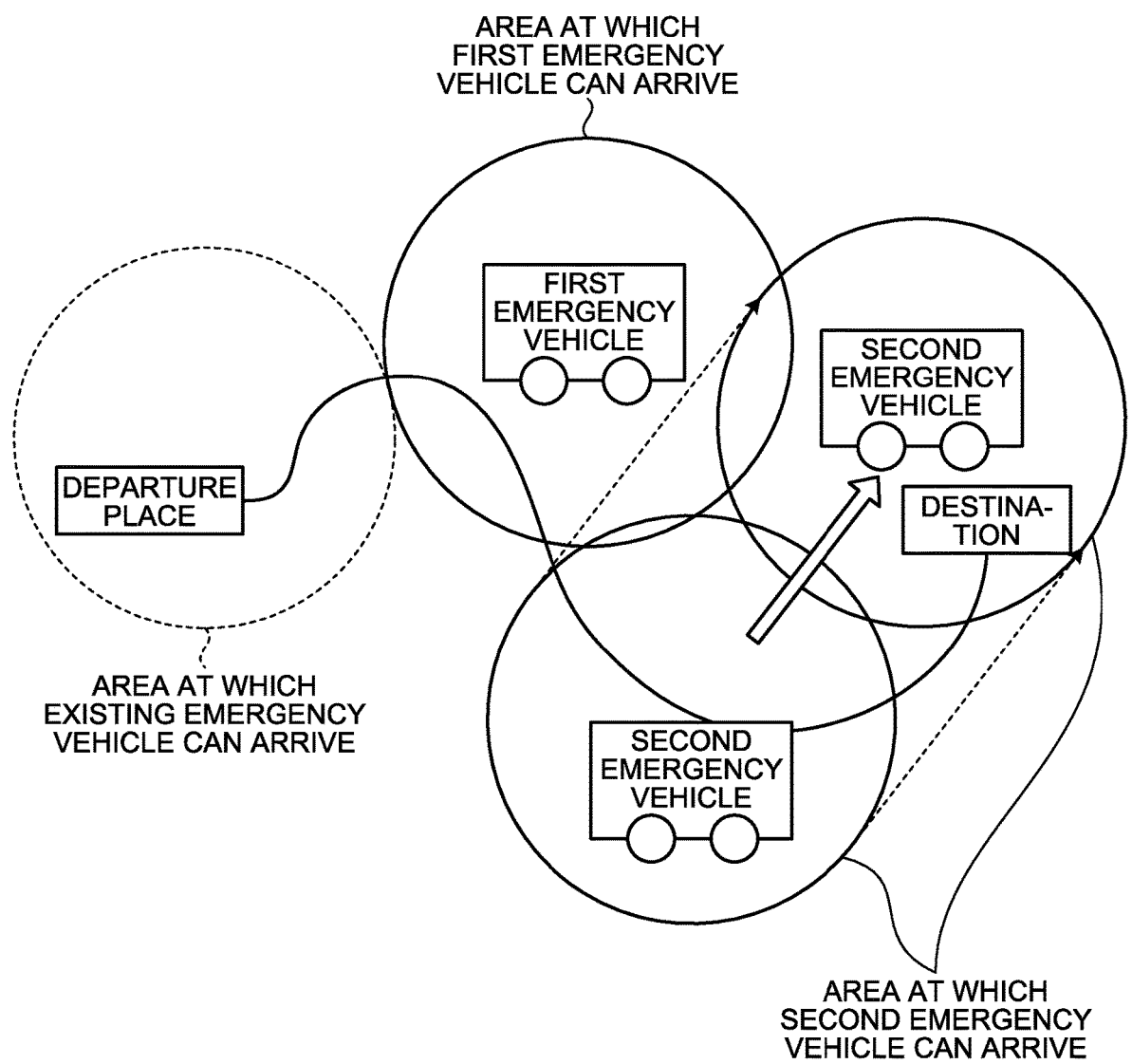
FIG. 10 is a diagram illustrating a method of allocating emergency vehicles by an emergency vehicle allocation system.

Next, a specific example of the above-described method for confirming the necessity of the emergency vehicle 60 will be described. FIG. 10 is a diagram illustrating an outline illustrating a method for deploying the emergency vehicle 60. In FIG. 10, the above-described travel route of the target vehicle 40 is a curve connecting the departure place to the destination.

As illustrated in FIG. 10, in the travel route of the target vehicle 40, an area where an existing emergency vehicle 60 can arrive at the vehicle 40 within a predetermined arrival time is an area at which an existing emergency vehicle can arrive (an area surrounded by a dotted line). In the example illustrated in FIG. 10, an area from a departure place to a predetermined travel route can be covered by the existing emergency vehicle 60 (steps ST22 and ST23 in FIG. 9). In addition, in a portion of the travel route at which the existing emergency vehicle 60 cannot arrive within the predetermined arrival time, first, an existing allocated emergency vehicle 60 is searched for (step ST24 in FIG. 9). If there is no existing allocated emergency vehicle 60, an emergency vehicle 60 is newly allocated. A first emergency vehicle and a second emergency vehicle are deployed at positions from which the first emergency vehicle and the second emergency vehicle can arrive at the travel route of the target vehicle 40 within a predetermined arrival time. In addition, as necessary, the second emergency vehicle moves so as to be able to cover the travel route of the target vehicle 40 based on the travel route of the target vehicle 40 (arrow in FIG. 10). By the movement of the second emergency vehicle, the range that can be covered by the second emergency vehicle falls within the range of the dotted line arrow and the area at which the second emergency vehicle can arrive. Therefore, it becomes possible that the travel route of the target vehicle 40 can be covered.

Meanwhile, step ST5 is executed after the process in step ST3 of FIG. 8. That is, a signal of request to search for an empty parking lot is transmitted from the vehicle management apparatus 20 to the parking lot management center 30. As a result, in step ST5, the parking lot management control unit 33 of the parking lot management center 30 searches for an empty parking lot existing along the travel route based on the signal of request to search for an empty parking lot received from the vehicle management apparatus 20 and the time zone of parking of the vehicle 40. Note that the parking lot management center 30 associates the received parking lot information with the parking lot identification information in each parking lot 70 and stores the parking lot information in the parking lot management database 34a of the storage unit 34 as needed.

Subsequently, in step ST6, the parking lot management center 30 transmits the parking reservation information to an empty parking lot, and makes a so-called tentative reservation in which the empty parking lot that has been searched for cannot be temporarily reserved by another vehicle at the time point and during the time zone when the vehicle 40 is parked in the parking lot based on the travel route of the vehicle 40. Here, the parking reservation information includes a parking start time at which parking of the vehicle 40 starts in the parking lot 70, a parking finish time at which the vehicle 40 departs from the parking lot, information regarding a parking position for selecting a place to park the vehicle 40 in the parking lot 70 and the like. Note that the parking reservation information may include other information. The parking lot management center 30 transmits list information of a plurality of empty parking lots that has been tentatively reserved (hereinafter referred to as "parking lot candidates") as described above to the vehicle management apparatus 20.

In parallel with these steps ST5 and ST6, the emergency vehicle 60 executes steps ST7 and ST8. That is, based on the necessity of the emergency vehicle 60 confirmed as described above, the emergency vehicle 60 is searched for in step ST7. In addition, as necessary, in step ST8, the emergency vehicle 60 is tentatively reserved based on the travel route of the target vehicle 40. If the tentative reservation is made, the emergency vehicle 60 transmits information indicating that the tentative reservation has been completed to the vehicle management apparatus 20.

Figure 11:
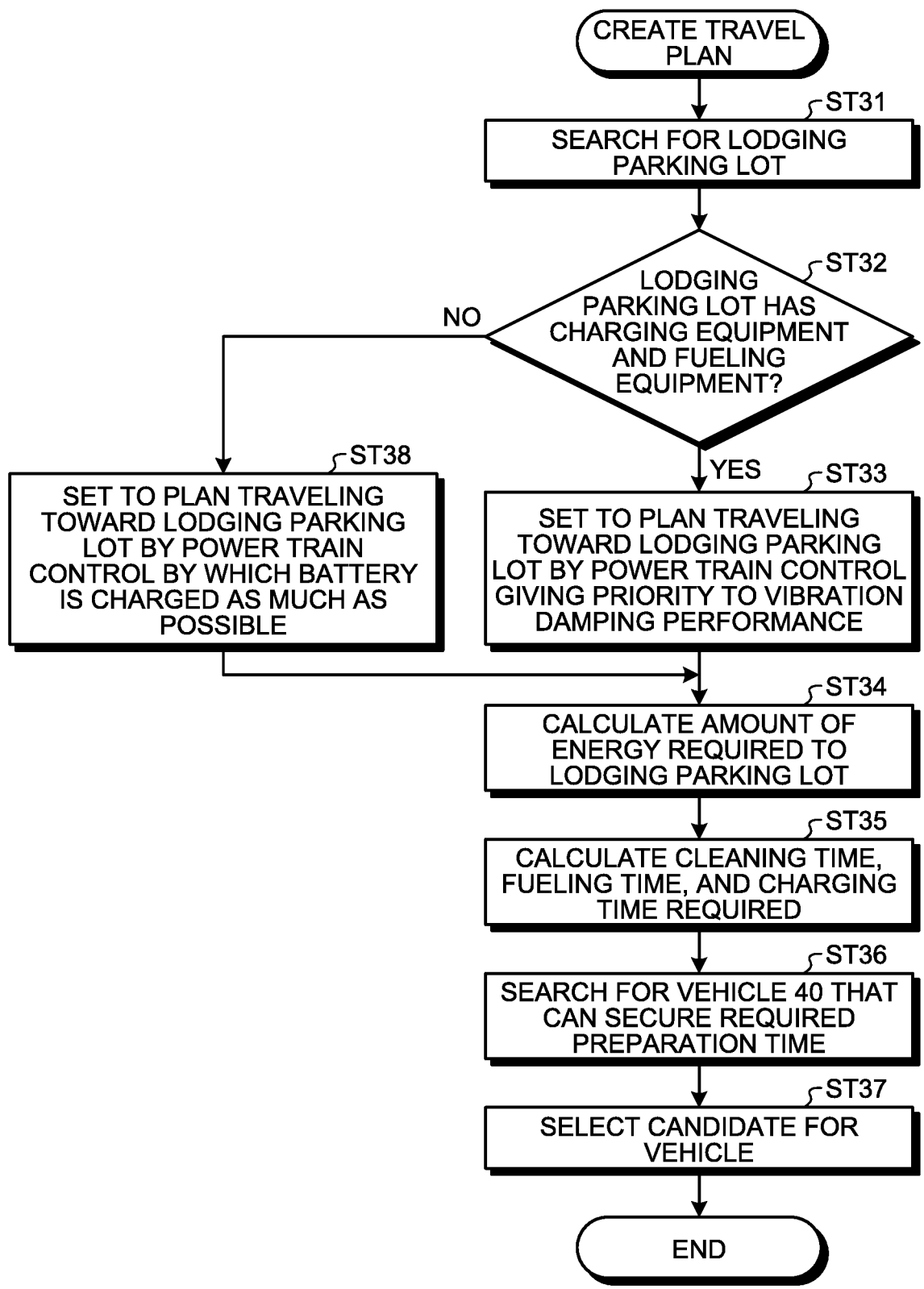
FIG. 11 is a flowchart illustrating a method for creating a travel plan of FIG. 8.

Thereafter, in step ST9, the vehicle management apparatus 20 creates a plurality of travel plans. Here, a specific example of a method for creating a travel plan will be described. FIG. 11 is a flowchart illustrating a method for creating a travel plan of FIG. 8.

As illustrated in FIG. 11, in the method for creating a travel plan according to the present embodiment, first, in step ST31, the vehicle management control unit 23 searches for parking lot information of the lodging parking lot 70 from the travel management database 24a of the storage unit 24 based on the list information of the parking lot candidates received from the parking lot management center 30. As described above, the parking lot information includes at least various kinds of information such as the position information, the charging equipment information, the fueling equipment information, the reservation status information, and the parking status information in each parking lot 70.

Next, the process proceeds to step ST32, and the vehicle management control unit 23 judges whether at least one of the charging equipment and the fueling equipment exists in the lodging parking lot 70 based on the parking lot information of the lodging parking lot 70 that has been searched for. If the vehicle management control unit 23 judges that the charging equipment or the fueling equipment exists in the lodging parking lot 70 that has been searched for, the process proceeds to step ST33.

In step ST33, the vehicle management control unit 23 makes setting so as to perform power train control which is travel control giving priority to vibration damping performance in the vehicle 40 based on the travel route that has been searched for in the above-described step ST3. As a result, a plurality of travel plans that can ensure vibration damping performance as much as possible in the vehicle 40 is made.

Next, the process proceeds to step ST34. In step ST34, the vehicle management control unit 23 calculates the amount of energy required from a departure position to a lodging parking lot based on a plurality of travel plans set so as to perform power train control giving priority to vibration damping performance. Thereafter, the process proceeds to step ST35, and the vehicle management control unit 23 calculates cleaning time, fueling time, and charging time required (hereinafter referred to as "required preparation time") in each vehicle 40 based on vehicle information received from each vehicle 40 in the above-described step ST1. The calculated required preparation time for each vehicle 40 is stored in the travel management database 24a.

Thereafter, the process proceeds to step ST36. In step ST36, the vehicle management control unit 23 searches for a vehicle 40 that can secure the calculated required preparation time based on the received vehicle information. Thereafter, in step ST37, the vehicle management control unit 23 selects at least one vehicle 40 as a candidate for a vehicle 40 that can be used by a user from the vehicles 40 that have been searched for. The vehicle management control unit 23 includes information of the candidate for the vehicle 40 in the travel plan information.

Meanwhile, in step ST32, if the vehicle management control unit 23 judges that neither charging equipment nor fueling equipment exists in the lodging parking lot 70 that has been searched for, the process proceeds to step ST38. In step ST38, the vehicle management control unit 23 makes setting so as to perform power train control which is travel control by which a battery is charged as much as possible in the vehicle 40 to suppress a reduction in the battery charge amount based on the travel route that has been searched for in the above-described step ST3. The vehicle management control unit 23 makes a plurality of travel plans so as to charge the battery in the vehicle 40 as much as possible. The travel plan in this case is a travel plan so as to be able to maintain a state of not using an engine of the vehicle 40 and to use at least one of electric power and fuel in a time zone, such as a bedtime zone, set in advance in the vehicle 40. That is, the vehicle management control unit 23 makes a travel plan in which the battery charge amount in a battery of the vehicle 40 does not become 0 in a set period of time while the vehicle 40 is parked in the lodging parking lot 70.

Thereafter, the process proceeds to step ST34, and the vehicle management control unit 23 calculates the amount of energy required from the departure position to the lodging parking lot based on the plurality of travel plans set so as to perform power train control for charging a battery as much as possible. Thereafter, steps ST35 to ST37 are similar to the above-described processes. The travel plan list including a plurality of pieces of the travel plan information planned as described above is transmitted to the user terminal device 50 after step ST9 in FIG. 8. At the same time, the vehicle management apparatus 20 transmits the charge information corresponding to each of the plurality of travel plans in the travel plan list to the user terminal device 50.

Subsequently, in step ST10, a user selects a desired travel plan from a plurality of travel plans in the user terminal device 50. Here, the charge information corresponding to a travel plan is also transmitted to the user terminal device 50. Examples of the charge information include charge information based on the charge table of FIG. 3.

Here, the charge information will be described. In an example of the charge information of FIG. 3, for example, eight charge levels of S1, S2, A1, A2, B1, B2, C1, and C2 are set as charges. This charge level can be, for example, S1>S2>A1>A2>B1>B2>C1>C2. A specific example is as follows. That is, when a boarding place is set to a suburb and a getting-off place is set to a city center, if a parking charge in a case where the vehicle 40 is parked in a suburban parking lot 70 is less expensive than that in a case where the vehicle 40 is parked in a city center parking lot 70, as for a lodging timing, a less expensive charge can be set in a case where lodging is performed by parking the vehicle 40 in a suburban parking lot 70 before movement. Furthermore, as a parking lot 70 for parking the vehicle 40, for example, at the time of lodging in a suburb, a parking charge of a parking lot such as a coin parking lot (a suburb P in FIG. 3) may be less expensive than that of a parking lot such as a store parking lot (a suburban shop P in FIG. 3). Therefore, depending on a parking lot 70 used for the lodging parking lot 70, selected from parking lots 70 having different parking charges, a charge corresponding to a parking charge thereof can be set. Note that the "store P" refers to a parking lot of a commercial facility such as a hot spring facility, a supermarket, a shopping mall, an amusement park, a cartoon tearoom, a movie theater, a club, or a gas station. In addition, if the shop P is selected as a parking lot 70 to be used at the time of lodging or the like, it is also possible to collect a shop introduction fee or the like from the commercial facility of the shop P. In addition, charge setting may be changed depending on the day of the week. For example, it is also possible to set a charge when a boarding date or a getting-off date is a holiday to be higher than a charge when the boarding date and the getting-off date are weekdays.

After step ST10, the travel plan information selected by the user is transmitted from the user terminal device 50 to the vehicle management apparatus 20 together with the user identification information. Thereafter, in step ST11, the vehicle management apparatus 20 performs a process of determining a travel plan based on the received user identification information and the selected travel plan information. The determined travel plan information is associated with the user identification information and stored in the travel management database 24*a*.

Based on the parking lot information included in the travel plan selected by a user, the vehicle management apparatus 20 transmits the reservation information including so-called confirmed reservation information for securing a situation in which the user can park the vehicle 40 in a parking lot at the predetermined time point and during a predetermined time zone based on the travel plan to the parking lot management center 30. As a result, in step ST12, the parking lot management center 30 makes a so-called confirmed reservation in which a parking lot cannot be reserved by another vehicle 40 at the time point and during the time zone when the vehicle 40 is parked in the parking lot based on the travel route. The reservation information is stored in the parking lot management database 34*a* in association with the vehicle identification information of the vehicle 40. In addition, the parking lot management center 30 switches the tentatively reserved parking lot described above to an empty parking lot where parking by another vehicle is possible at the date and time and during the time zone when the tentative reservation was initially made. The parking lot management center 30 transmits a signal that the confirmed reservation of the parking lot has been completed to the vehicle management apparatus 20.

Meanwhile, after the travel plan is confirmed, the vehicle management apparatus 20 transmits the vehicle allocation approval signal for approving the allocation of a vehicle 40 selected by a user, the charge information, and electronic key data to the user terminal device 50. In step ST13, the user terminal device 50 receives the electronic key data. Here, the electronic key functions as a release key in the user terminal device 50, for example, when a user boards the vehicle 40 and drives or uses the vehicle 40 with various communication units such as Bluetooth (registered trademark) and Near Field Communication (NFC).

When receiving the signal that the confirmed reservation of the parking lot 70 has been completed, the vehicle management apparatus 20 transmits a signal of the vehicle allocation instruction to the vehicle 40 selected by the user. In step ST14, the vehicle 40 receives the information regarding the vehicle allocation instruction. Meanwhile, the vehicle management apparatus 20 transmits the signal of the vehicle allocation instruction to the emergency vehicle 60 which has been judged to be necessary by the process of confirming the necessity of the emergency vehicle 60 performed in step ST4 and has been tentatively reserved in step ST8. Note that the travel plan information may be transmitted as necessary. In step ST15, the emergency vehicle 60 receives the information regarding the vehicle allocation instruction. Incidentally, in the above-described confirmation of the necessity of an emergency vehicle 60, if the vehicle management apparatus 20 judges that it is not necessary to newly deploy an emergency vehicle 60, the vehicle allocation instruction is not transmitted, and step ST15 is omitted.

A predetermined worker or the like moves a vehicle 40 to the place for vehicle allocation, that is, the boarding place of the user. Note that the vehicle 40 may be moved to the place of vehicle allocation by automatic operation. Thereafter, in step ST16, the user unlocks the vehicle 40 that has been allocated using the electronic key data in the user terminal device 50 and instructs departure to the vehicle 40. Thereafter, in step ST17, the user boards the vehicle 40 and departs towards a getting-off place as the destination according to the travel plan information created in step ST9.

As described above, the vehicle 40 can be allocated and moved by the vehicle allocation system 1. Thereafter, according to either the travel plan of the power train control for charging a battery as much as possible or the travel plan of the power train control giving priority to vibration damping performance described above, the vehicle 40 is automatically operated or driven by the user to travel toward the reserved lodging parking lot 70.

In addition, after step ST11, if the process proceeds to step ST18, the vehicle management apparatus 20 changes the area of the emergency vehicle 60 such that the travel route of the vehicle 40 is maintained so as to be covered as the vehicle 40 moves. The vehicle management apparatus 20 transmits the vehicle allocation instruction to the emergency vehicle 60 so as to move based on the travel route of the vehicle 40. In step ST19, if the emergency vehicle 60 receives the vehicle allocation instruction including the information regarding the change in vehicle allocation area, the process proceeds to step ST20. In step ST20, the emergency vehicle 60 moves to a deployment position instructed by the movement of the vehicle 40, for example, like the second emergency vehicle of FIG. 10.

Here, as described above, the user information includes the information indicating whether the user is older than a predetermined age, or the information indicating whether the user has a predetermined disease, injury, or chronic disease. As a result, the vehicle management control unit 23 of the vehicle management apparatus 20 can recognize the vehicle 40 on which a user who is suspected of causing an abnormality is present. Therefore, in a case where the vehicle management apparatus 20 transmits the vehicle allocation instruction to the emergency vehicle 60, the vehicle allocation instruction is transmitted so as to deploy the emergency vehicle 60 near the vehicle 40 on which the user suspected of causing an abnormality is present. That is, in the case of the vehicle 40 on which the user suspected of causing an abnormality is present, the emergency vehicle 60 is allocated such that the predetermined arrival time is shortened. Therefore, a possibility that appropriate an emergency response can be performed to the user suspected of causing an abnormality is improved.

In addition, the user information includes the billing information regarding the charge for deploying the emergency vehicle 60. Therefore, the vehicle management apparatus 20 can distinguish a user who has paid the charge for deploying the emergency vehicle 60 from a user who has not paid the charge. As a result, by using a predetermined billing program stored in the vehicle management apparatus 20, a process with a more beneficial response can be performed by making a response to a user who has paid the charge different from a response to a user who has not paid the charge. Specifically, the predetermined arrival time in a vehicle 40 on which a user who has paid the charge is present is made shorter than the predetermined arrival time in a vehicle 40 on which a user who has paid the charge is not present. As a result, a user who has paid the charge increases a possibility of obtaining a feeling of security in the movement using the vehicle 40.

According to the embodiment of the present disclosure described above, the vehicle management apparatus 20 can allow the emergency vehicle 60 to arrive at the target vehicle 40 within a predetermined arrival time in a travel route of the vehicle 40. As a result, it is possible to improve a possibility that a predetermined response to an occupant of the target vehicle 40 can be promptly performed.

In addition, as a travel plan created by the vehicle management apparatus 20, a plan of the consumption of electric power in a battery of the vehicle 40 and a plan of the consumption of fuel in an engine of the vehicle 40 can be created according to the equipment of the parking lot 70 to be parked at the time of lodging or the like. Therefore, it is possible to reduce a possibility that the electric power of the battery of the vehicle 40 runs short while the user lodges in the vehicle 40.

Method for Performing a Process of Responding to Fire

Next, a case is described where fire or the like occurs in the surroundings while a vehicle 40 moves from a boarding place to a getting-off place in accordance with a travel plan, while the vehicle 40 is parked in the lodging parking lot 70 and a user lodges in the vehicle or the like. FIG. 12 is a flowchart illustrating a processing method in a case where fire occurs around the vehicle according to the embodiment.

As illustrated in FIG. 12, first, in step ST41, the electronic control unit 42 of the vehicle terminal device 41 in the vehicle 40 judges whether fire has occurred within a range of a predetermined distance from the vehicle 40. Here, the information indicating whether fire has occurred may be peripheral information measured using a sensor provided on the vehicle 40 or peripheral information received from the communication unit 43 via the network 10. That is, the sensor provided on the vehicle 40 and the communication unit 43 act as peripheral situation detecting units capable of detecting the situation of a peripheral area within a range of a predetermined distance from the vehicle 40. If the electronic control unit 42 as a peripheral situation judging unit judges that no fire has occurred around the vehicle 40 (NO in step ST41), the process is terminated. Meanwhile, if the electronic control unit 42 judges that fire has occurred around the vehicle 40 (YES in step ST41), the process proceeds to step ST42.

In step ST42, the electronic control unit 42 judges whether it is necessary to evacuate the vehicle 40 from the current position based on various indices such as a distance between a place where the fire has occurred and the vehicle 40 and the scale of the fire. If the electronic control unit 42 judges that it is not necessary to evacuate the vehicle 40 (NO in step ST42), the process is terminated. Meanwhile, if the electronic control unit 42 judges that it is necessary to evacuate the vehicle 40, the process proceeds to step ST43.

In step ST43, the electronic control unit 42 controls an engine and an MG (not illustrated) of the vehicle 40 to prohibit a use of the engine, and starts to use the MG. As a result, the vehicle 40 starts traveling by driving of the MG. Thereafter, the process proceeds to step ST44, and the electronic control unit 42 judges whether the SOC of the battery mounted on the vehicle 40 is equal to or less than a specified amount. If the electronic control unit 42 judges that the SOC of the battery is greater than the specified amount (NO in step ST44), the process is terminated, and traveling of the vehicle 40 by the MG continues. Meanwhile, if the electronic control unit 42 judges that the SOC of the battery is equal to or less than the specified amount (YES in step ST44), the process proceeds to step ST45.

In step ST45, the electronic control unit 42 controls the vehicle 40 to instruct a user to move the vehicle 40 to a charging facility via the input/output unit 45, or causes the vehicle 40 to travel to the charging facility by automatic operation. As a result, the vehicle 40 is moved to the charging facility so as to charge the battery. As described above, a process of responding to fire is terminated.

In the above process of responding to fire, the electronic control unit 42 judges the situation of a peripheral region (peripheral situation) of the vehicle 40. However, a unit for judging the peripheral situation is not necessarily limited to the electronic control unit 42. That is, the vehicle management apparatus 20 as a peripheral situation judging unit may judge the peripheral situation of the vehicle 40. In this case, in a case where fire occurs in the surroundings and it is necessary to evacuate the vehicle 40, the vehicle management apparatus 20 sends a control signal of prohibiting use of an engine and starting use of an MG via the network 10 to the vehicle 40 to control the engine and the MG.

As described above, in a case where fire occurs around the vehicle 40 and it is necessary to evacuate the vehicle 40, use of an engine is prohibited, and the vehicle 40 can be moved by using the MG. Therefore, it is possible to reduce a possibility that an engine misfires due to shortage of oxygen contained in intake air because of the fire to make traveling difficult.

As described above, the embodiment of the present disclosure has been specifically described. However, the present disclosure is not limited to the embodiment described above, and various modifications based on the technical idea of the present disclosure may be made. For example, the configuration of each apparatus described in the above embodiment is merely an example, and a configuration different therefrom configuration may be used as necessary.

For example, the information transmitted/received among the vehicle management apparatus 20, the parking lot management center 30, the respective vehicles 40, the respective user terminal devices 50, and the emergency vehicle 60 according to the above-described embodiment is not necessarily limited to the above-described information. Information different from the above-described information may be transmitted/received as necessary.

For example, the vehicle 40 used in the above-described embodiment is not necessarily limited to a accommodation vehicle, and a normal vehicle which is not an accommodation may be adopted. In addition, in a case where the vehicle 40 is an accommodation vehicle, various accommodation vehicles in which lodging is possible can be adopted. The accommodation vehicle may be an accommodation vehicle that can be automatically operated, an accommodation vehicle operated by another driver, or an accommodation bus or a large-sized vehicle in which accommodation is available. Furthermore, the vehicle 40 may be any type vehicle such as a hybrid vehicle including both an engine and a motor, a vehicle including an engine but not including a motor, or an Electric Vehicle (EV) including a motor but not including an engine.

In addition, the method for processing vehicle allocation executed by the vehicle allocation system 1 in the above-described embodiment is not limited to the above-described order, but the order of the steps can be changed within a range where the method for processing vehicle allocation can be executed. For example, the transmission of the vehicle allocation approval signal, the charge information, and the electronic key data may be performed after the confirmed reservation of the lodging parking lot 70 is completed. In addition, in the above-described embodiment, the confirmation of the necessity of the emergency vehicle 60 in step ST4 is executed subsequently to step ST3, but the present disclosure is not necessarily limited to the case of execution subsequently to step ST3. That is, the process of confirming the necessity of the emergency vehicle 60 may be executed at any timing as long as being executed after the process in step ST3 and before the process of the vehicle allocation instruction of the emergency vehicle 60 in step ST14.

In addition, in the above-described embodiment, an example is described, in which the plan of consumption of electric power in a battery of the vehicle 40 and consumption of fuel in an engine of the vehicle 40 is created according to equipment of the parking lot 70 to be parked at the time of lodging or the like. However, the present disclosure is not necessarily limited to the case at the time of lodging. Specifically, the present disclosure may also be similarly applied to a case where an accommodation vehicle stops at a predetermined parking lot and a driver or a fellow passenger performs other work or the like. In addition, the time zone during which the vehicle 40 is parked is not necessarily limited to nighttime. The present disclosure may be similarly applied even to a case where the time zone of parking is daytime.

In addition, in the above-described embodiment, the vehicle management apparatus 20 searches for the emergency vehicle 60. However, an emergency vehicle management center for managing the emergency vehicle 60 may be separately installed. In this case, the emergency vehicle management center can execute various kinds of management regarding the emergency vehicle 60, such as searching for the emergency vehicle 60, determining a deployment position thereof, or allocation thereof.

The vehicle management apparatus according to an embodiment of the present disclosure, it is possible for an emergency vehicle to arrive at a target vehicle within a predetermined arrival time. Therefore, it is possible to improve a possibility to promptly provide a predetermined response to an occupant of the target vehicle.

According to an embodiment, the vehicle management apparatus can recognize a vehicle on which a user is present, who is more likely to suffer from physical condition change. Therefore, by deploying an emergency vehicle near the vehicle on which the user is present, who is more likely to suffer from physical condition change, it is possible to improve a possibility that an appropriate response can be performed to the user.

According to an embodiment, the vehicle management apparatus can distinguish a user who has paid a charge for deploying an emergency vehicle from a user who has not paid the charge. Therefore, a response to the user who has paid the charge can be different from a response to the user who has not paid the charge, and can be a more beneficial response. Therefore, the user who has paid the charge can obtain a feeling of security in traveling using a vehicle.

According to an embodiment, a predetermined arrival time depending on the user information can be set, and therefore it is possible to appropriately deploy an emergency vehicle.

According to an embodiment, in a case where fire occurs around a vehicle and it is necessary to evacuate the vehicle, the use of an engine is prohibited. Therefore, it is possible to reduce a possibility that an engine misfires due to a shortage of oxygen contained in intake air because of the fire to make traveling difficult.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle management apparatus comprising:
a communication unit configured to communicate with a vehicle with lodging capability and to communicate with an emergency vehicle;
a vehicle management control unit configured to create a travel plan based on information transmitted to the communication unit from a user terminal operated by a user, and manage travel of the vehicle;

an emergency vehicle management unit configured to manage deployment of the emergency vehicle at a position so that the emergency vehicle can arrive in a route, on which the vehicle moves according to the travel plan, within a predetermined arrival time, based on information transmitted to the emergency vehicle management unit from the communication unit; and a user information storage unit configured to store user information regarding a user of the vehicle, wherein the vehicle management control unit is configured to:
   set the predetermined arrival time based on the user information; and
   manage deployment of the emergency vehicle to respond to a movement of the vehicle so that the emergency vehicle can arrive at the vehicle within the predetermined arrival time.

2. The vehicle management apparatus according to claim 1, wherein
   the user information includes information indicating whether the user is older than a predetermined age, or information indicating whether the user has a predetermined disease, injury, or chronic disease.

3. The vehicle management apparatus according to claim 1, wherein
   the user information includes billing information regarding a charge for deploying the emergency vehicle.

4. The vehicle management apparatus according to claim 1, wherein
   the vehicle includes an engine and an electric motor as power sources,
   the vehicle management apparatus further comprises a peripheral situation judging unit configured to judge a situation of a peripheral area within a range of a predetermined distance from the vehicle, and
   the vehicle management control unit is configured to send a signal to prohibit use of the engine to the vehicle if the peripheral situation judging unit judges that fire has occurred in the peripheral area during use of the vehicle.

* * * * *